United States Patent [19]

Suzuki et al.

[11] Patent Number: 5,066,068
[45] Date of Patent: Nov. 19, 1991

[54] PANEL MOVING MECHANISM FOR SUNSHINE ROOF

[75] Inventors: Katsuhiro Suzuki; Akira Nishimura, both of Toyota; Takatsugu Yamauchi, Shinjuku; Kazuhisa Nagata, Okazaki; Hironori Ochiai, Nagoya, all of Japan

[73] Assignees: Toyota Jidosha Kabushiki Kaisha; Aisin Seiki Kabushiki Kaisha, Japan

[21] Appl. No.: 579,350

[22] Filed: Sep. 7, 1990

Related U.S. Application Data

[63] Continuation of Ser. No. 333,573, Apr. 5, 1989, abandoned.

[30] Foreign Application Priority Data

| Apr. 5, 1988 | [JP] | Japan | 63-46108[U] |
| May 9, 1988 | [JP] | Japan | 63-60990[U] |
| May 11, 1988 | [JP] | Japan | 63-61839[U] |
| May 11, 1988 | [JP] | Japan | 63-61840[U] |

[51] Int. Cl.⁵ ............................................. B60J 7/05
[52] U.S. Cl. .................................... 296/221; 296/213; 296/223
[58] Field of Search ................ 333/573; 296/213, 221, 296/223

[56] References Cited

U.S. PATENT DOCUMENTS

| 4,632,449 | 12/1986 | Masuda | 296/221 X |
| 4,647,104 | 3/1987 | Kohlpaintner et al. | 296/221 |
| 4,732,422 | 3/1988 | Schlapp et al. | 296/223 X |

*Primary Examiner*—Dennis H. Pedder
*Attorney, Agent, or Firm*—Kenyon & Kenyon

[57] ABSTRACT

A panel moving mechanism for a sunshine roof of the type in which the rear end of a panel for closing an opening of the roof of a vehicle is raised and lowered. The mechanism includes a shoe and an arm which are pivotally connected. A pair of pins protrude from the arm and are inserted into respective guide grooves provided in a guide block and a bracket connected to the panel. The longitudinal axes of these guide grooves are bent at the middle sections thereof and are arranged in such a manner that they are not parallel. When the shoe moves toward the front end of the vehicle, the arm is gradually brought to a raised position, thereby raising the rear end of the panel. When the shoe moves toward the rear end of the vehicle, the arm is gradually brought to a horizontal position, thereby lowering the rear end of the panel.

20 Claims, 11 Drawing Sheets

PANEL MOVING MECHANISM FOR SUNSHINE ROOF

This application is a continuation of application Ser. No. 07/333,573, filed Apr. 5, 1989, abandoned.

BACKGROUND OF THE INVENTION

1. Field of the Invention

This invention relates to a panel moving mechanism for a sunshine roof of the type in which a section of the roof of a vehicle is lodged within the roof structure after being raised or lowered.

2. Description of the Related Art

A conventional panel moving mechanism for a sunshine roof structure to be installed in a vehicle is designed so that sliders move linearly in the longitudinal direction of the vehicle, the sliders being guided along guide grooves formed in brackets of a roof panel and thereby causing the roof panel to be raised or lowered. However, this construction requires long guide grooves that will allow the sliders to move to a position near the front end of the roof panel, thereby impairing the rigidity of the support provided for the roof panel.

In another conventional panel moving mechanism, an arm is provided on each of the sliders of the type mentioned above, which arm is engaged with a guide groove of the corresponding bracket of a roof panel. The problem with this arrangement is that the inclination angle of the guide grooves must be considerable before the roof panel can move vertically by a large amount, resulting in a great impact at the stroke ends.

This invention has been contrived in view of the problems mentioned above. It is accordingly an object of this invention to provide a panel moving mechanism which affords substantial panel supporting rigidity and which allows a roof panel to be raised or lowered more smoothly than in the prior art.

SUMMARY OF THE INVENTION

This invention provides a panel moving mechanism for a sunshine roof of the type which includes a roof panel and a shoe. Located between the roof panel and the shoe is a guide means which comprises a pair of guide grooves formed in the roof panel and pins. The pins are mounted on an arm and are respectively inserted in the guide grooves to move along within them. The guide grooves are arranged in such a manner that they are not parallel as seen in the direction perpendicular to the moving direction of the shoe. Because of this arrangement, movement of the shoe to one end of the guide grooves causes the arm to be gradually brought to a raised position, thereby smoothly raising the roof panel. On the other hand, movement of the shoe to the other end of the guide grooves causes the arm to be gradually brought to a horizontal position, thereby smoothly lowering the roof panel.

DETAILED DESCRIPTION OF THE PREFERRED EMBODIMENTS

Figure 1:
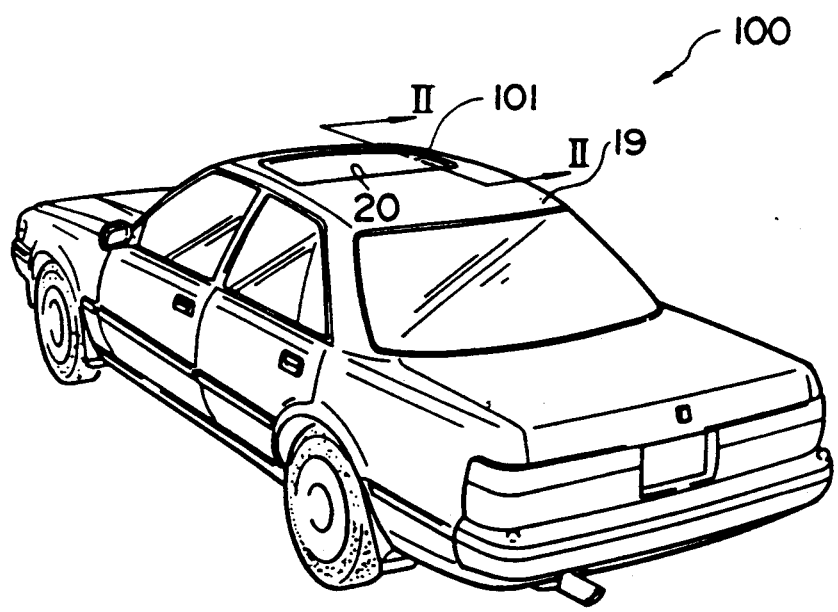
FIG. 1 is a perspective view of a vehicle in which the sliding panel moving mechanism is installed.
Figure 2:
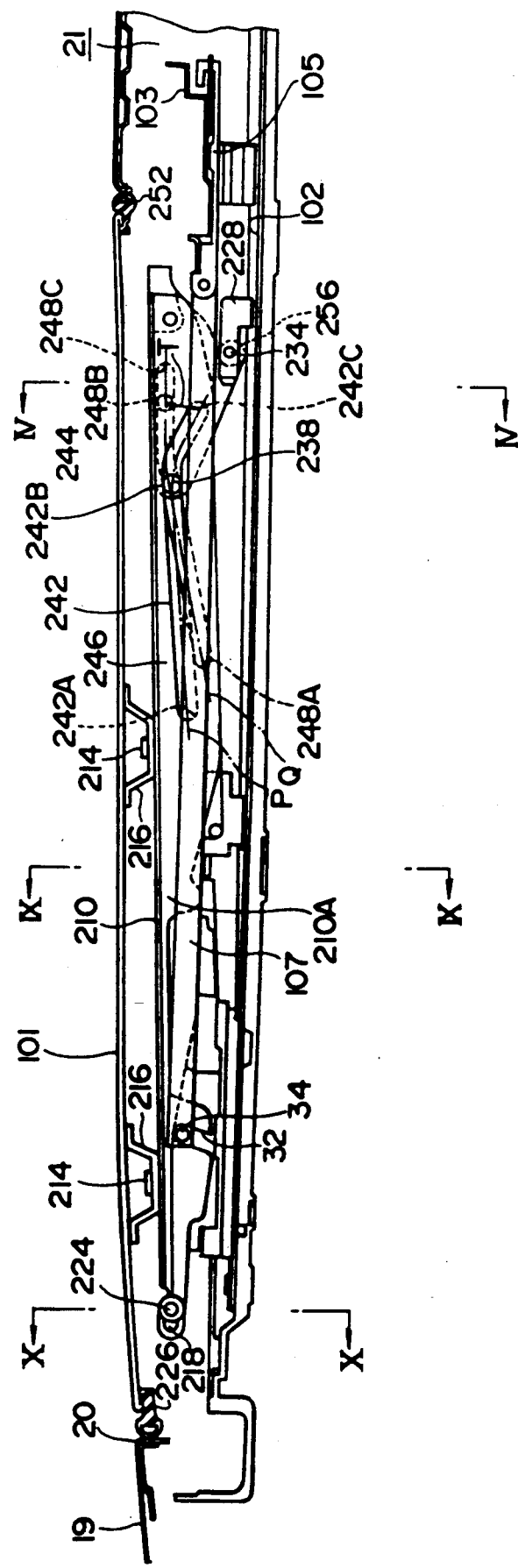
FIG. 2 is a sectional view taken along the line II—II of FIG. 1 showing essential parts of an embodiment of this invention.
Figure 3:
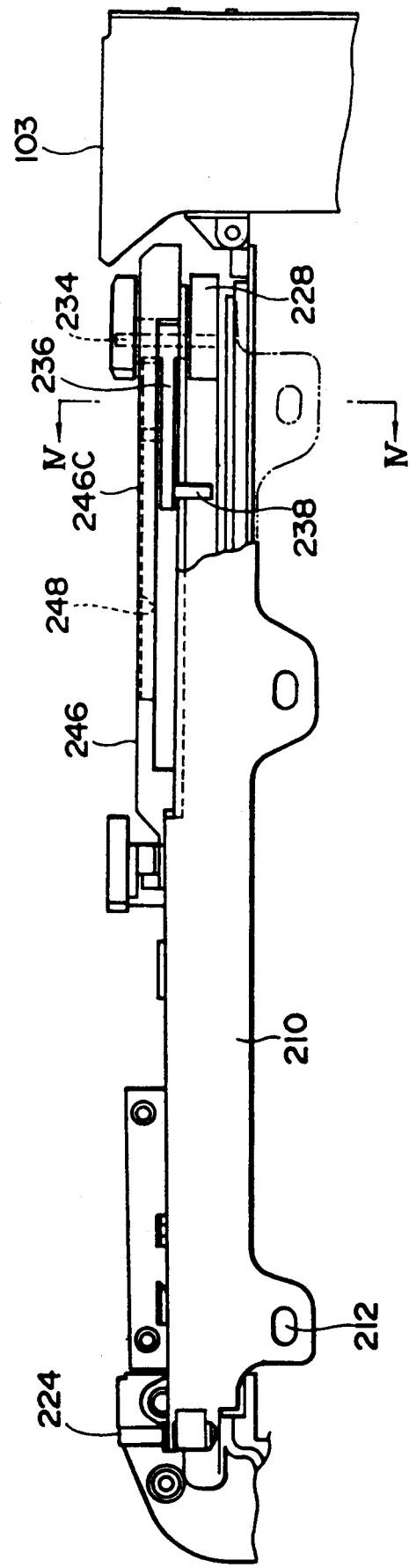
FIG. 3 is a plan view of FIG. 2.

FIG. 1 shows a vehicle 100 to which an embodiment of this invention is applied. The vehicle 100 has a roof 19 including an opening 20, which is closed by means of a sliding panel 101. As shown in FIG. 2, the outer surface of the sliding panel 101 is at the same level as the roof 19.

Figure 7:
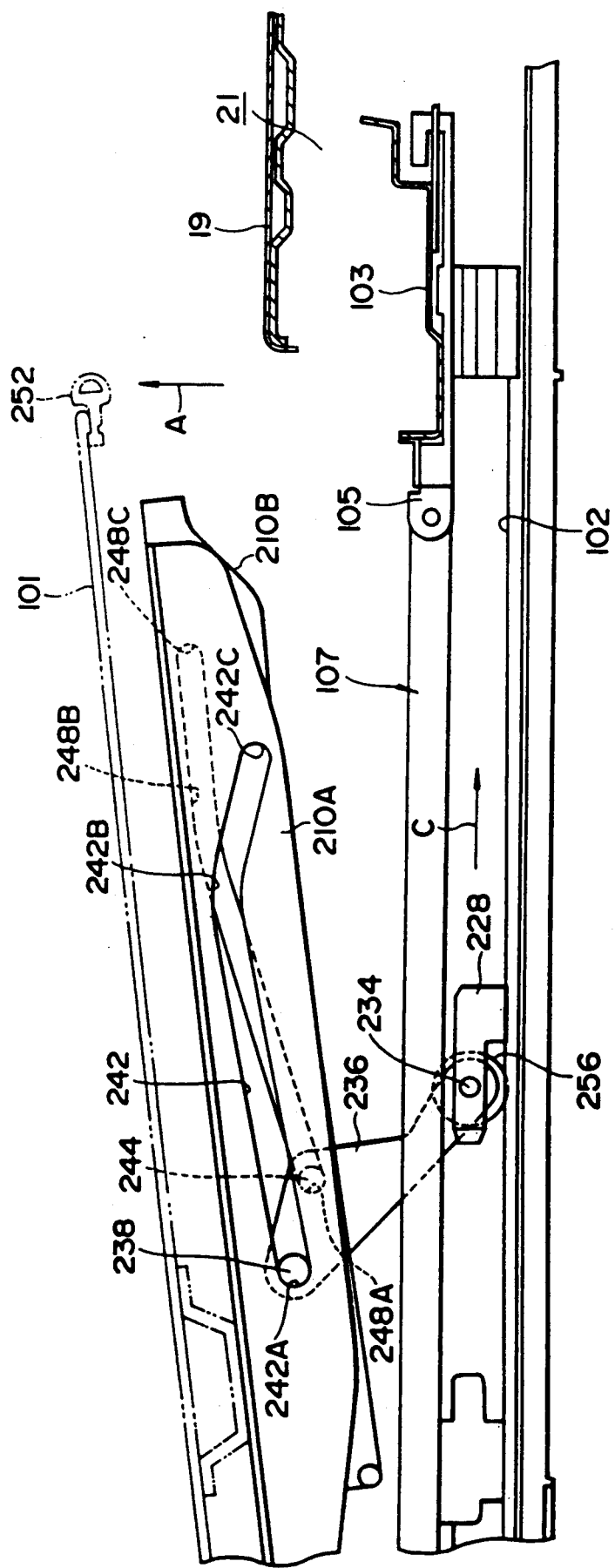
FIG. 7 is an enlarged view, similar to FIG. 6, but showing a tilt-up state in which the rear end of the sliding panel is raised.
Figure 8:
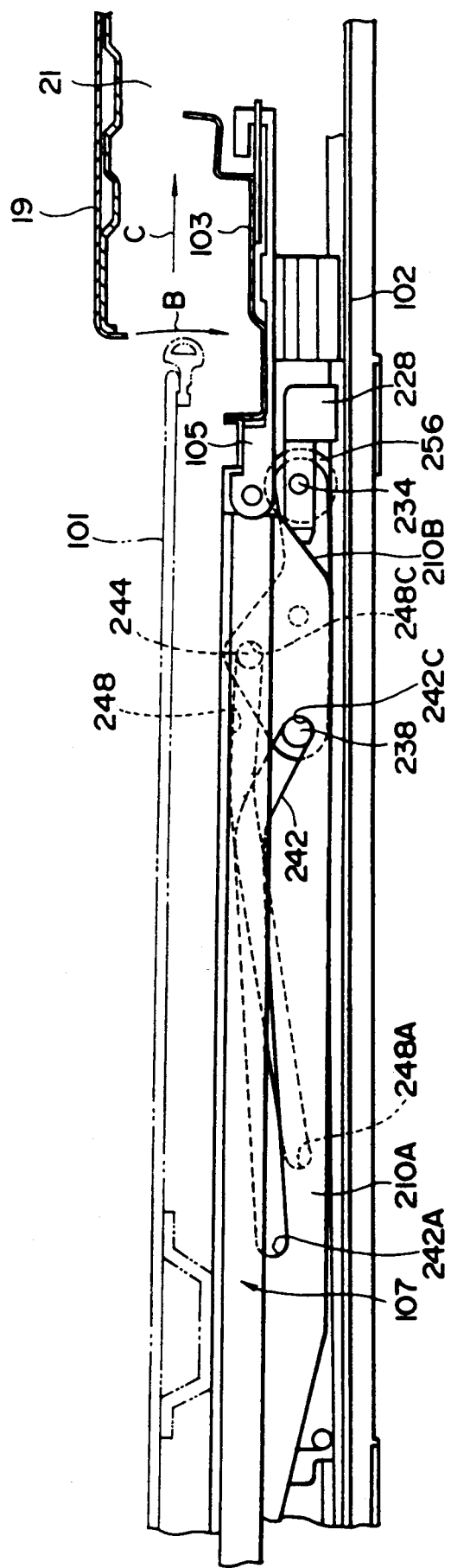
FIG. 8 is an enlarged view, similar to FIG. 6, but showing a tilt-down state in which the sliding panel is lowered.

As shown in FIG. 7, the rear end of this sliding panel 101 can be raised (in the direction indicated by the arrow A) to a tilt-up position to open the rear portion of the opening 20. As shown in FIG. 8, the rear end of the sliding panel 101 can be lowered (in the direction indicated by the arrow B) to a tilt-down position in which it is below the roof. Then the panel can be moved further toward the rear end of the vehicle (in the direction indicated by the arrow C) to a lodging position, where it is lodged in a housing 21 provided within the structurre of the roof 19.

The above movements of the slide panel 101 are effected by means of the slide panel moving mechanism shown in FIGS. 2 to 5.

A pair of such moving mechanisms are symmetrically provided on both lateral sides of the vehicle. FIGS. 2 to 5 show only the mechanism provided on the right-hand side of the vehicle.

With reference to FIGS. 2-5, the panel support bracket 210 has attachment holes 212. The sliding panel 101 includes reinforcing plates 216, which are fixed to the support bracket 210 through the attachment holes 212 by clips 214 (FIG. 2), whereby the right-hand portion of the sliding panel 101 is fixed to the support bracket 210. The panel support bracket 210 is bent at right angles at its outer end to form a downwardly directed vertical section 210A. Formed at the front end of this vertical section 210A is an elongated hole 218, by means of which the bracket 210 is pivoted to a front shoe 222 through a horizontal pin 224. The horizontal pin 224 and the elongated hole 218 form an axis of rotation when the sliding panel 101 is tilted.

Figure 11:
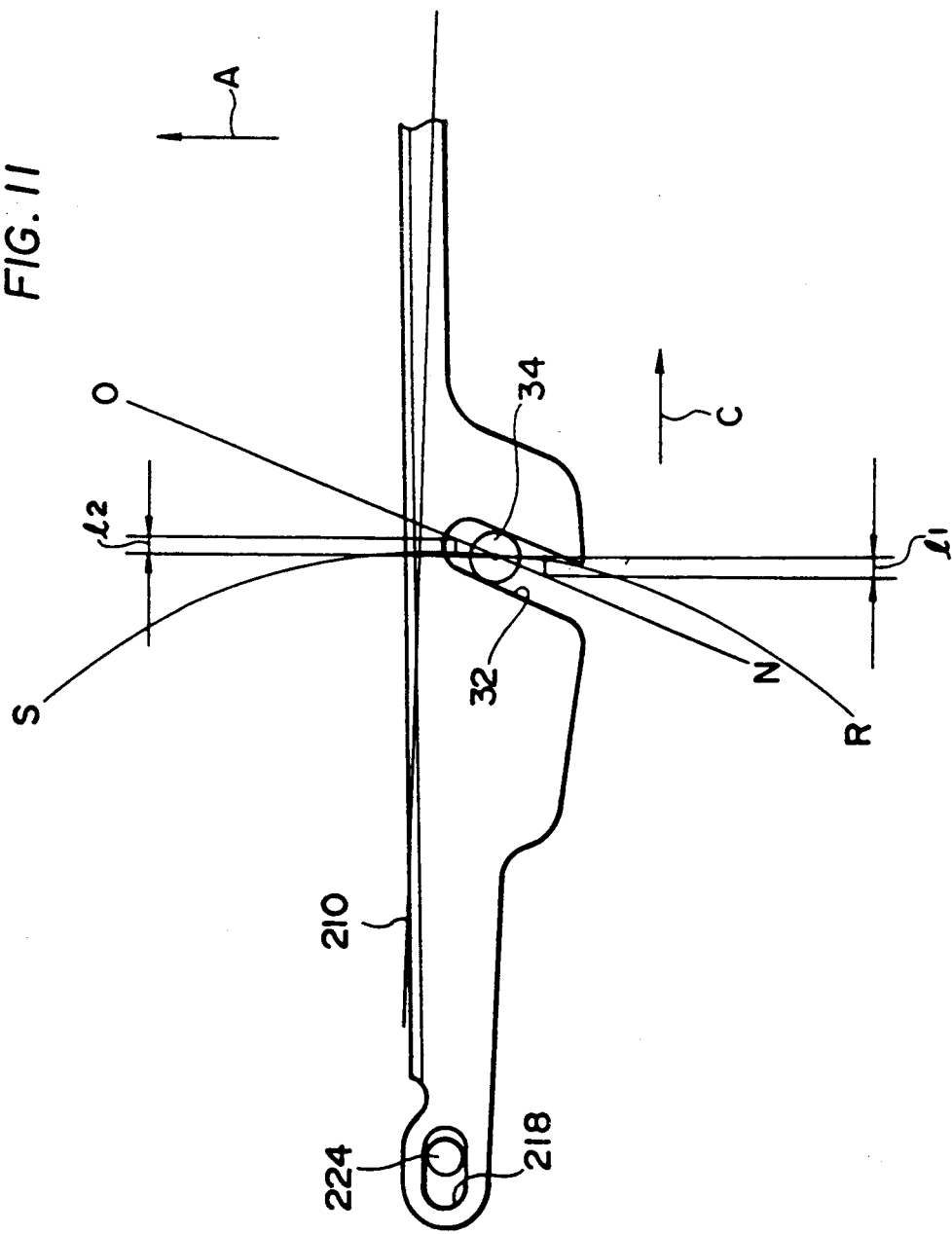
FIG. 11 is a side view showing the relationship between an elongated groove of a support bracket and a pin.

An elongated groove 32 is provided in the vertical section 210A to the rear of the elongated hole 218. The elongated groove 32 is penetrated by a pin 34 having a horizontal axis and fixed to the front shoe 222. As shown in FIG. 11, the axis ON of the elongated groove 32 is inclined so that the upper end of the groove is to the rear end of the lower end. Accordingly, supposing RS is the imaginary locus of the movement of the axis of the pin 34 around the horizontal pin 224, the support bracket 210 is moved toward the rear by a distance $l_1$ when the sliding panel 101 is raised from the closed position (indicated by a solid line in FIG. 11) to the tilt-up position. On the other hand, the support bracket 210 is moved forward by a distance $l_2$ when the sliding panel is lowered from the tilt-up to the tilt-down position. The horizontal pin 224 and the elongated hole 218 move relative to each other during theses movements.

Attached to the front end of the sliding panel 101 is a weather strip 226, which, as shown in FIG. 2, is in close contact with the front edge of the opening 20 when the panel is in the closed state, thereby preventing rain from entering the interior of the vehicle. Thanks to the above-described arrangement, the slide panel 101 moves away from the front edge of the opening 20 during tilt-up, so that the load on the weather strip 226 is lessened, thereby preventing the weather strip from becoming worn. On the other hand, a weather strip 252 provided at the rear end of the sliding panel 101 is also kept free from abrasion since the sliding panel 101 advances by the distance $l_2$ during tilt-down of the rear end thereof, so that it is spaced apart from the rear edge of the opening 20.

The front shoe 222 is designed to be slidable in the logitudinal direction of the vehicle, guided by a guide rail 102 provided within the structure of the roof 19 and extending in the longitudinal direction of the vehicle.

Provided at a position near the rear end of the panel support bracket 210 is a rear shoe 228, which includes a downwardly protruding arm 228A that is guided along a guide groove 102A of the guide rail 102. Connected to this rear shoe 228 is one end of a drive cable 232, the other end of which extends toward the front end of the vehicle and is connected to driving means (not shown). This drive cable 232 receives the driving force from the driving means and transmits tractive or compressive force to the rear shoe 228, thereby moving the latter toward the front or rear end of the vehicle.

The rear shoe 228 includes a pair of arms 228B and 228C protruding toward the front end of the vehicle. To each of the arms is pivoted the base section of a link 236 through a horizontal pin 234. This link 236 extends toward the front end of the vehicle. Protruding horizontally from the inner sie of its front end is a pin 238, which is inserted into a guide groove 242 provided in the vertical section 210A of the panel support bracket 210. A horizontal pin 244 protrudes from the outer side of the link 236. The horizontal pin 244 is situated nearer to the horizontal pin 234 than the horizontal pin 238 and is inserted into a guide groove 248 formed in a guide block 246. This guide block 246 is arranged in the longitudinal direction of the vehicle, on the outer side of the support bracket 210. It includes thick-walled portions 246A and 246B situated at the end sections thereof and protruding toward the panel support bracket 210 by a distance S. The thick-walled sections 246A and 246B of the guide block 246 are fixed to the vertical section 210A of the bracket 210, thereby defining a space (with the width S, see FIG. 4) for receiving the link 236 between the middle portion of the guide block 246 and the vertical section 210A The guide grooves 242 and 248 extend longitudinally, i.e., at right angles to the transverse direction (indicated by the arrow D) of the vehicle. They are at their highest in the respective middle portions 242B and 248B in the longitudinal direction of the vehicle, being downwardly inclined toward the respective front ends 242A and 248A as well as toward the respective rear ends 242C and 248C. The grooves 242 and 248 overlap each other, as seen in the transverse direction of the vehicle, only in the middle portions thereof, the front end 242A being higher than the front end 248A, and the rear end 242C being lower than the rear end 248C. Further, the distance between the middle sections 242B, 248B and the front ends 242A, 248A is longer than the distance between the middle sections 242B, 248B and the rear ends 242C, 248C. Thereby a stroke in up or down direction in tilt-up can become longer than in tilt-down. The respective middle sections 242B and 248B of the guide grooves 242 and 248 form the apexes of angles $\theta_1$ and $\theta_2$, respectively, $\theta_1$ being smaller than $\theta_2$. These guide grooves 242, 248 receive an upward thrust force by the horizontal pins 238, 244 when the rear shoe 228 advances guide and transmit the upward thrust force to the slide panel 101 through the support bracket 210. The amount of the upward thrust force becomes the sum of each upward opening force which the guide grooves 242, 248 receive by the horizontal pins 238, 244. Thus, the load is not concentrated on only one of the horizontal pins 238, 244.

The maximum vertical distance between the longitudinal axes P and Q of these guide grooves 242 and 248 (the distance T in FIG. 2) is designed to be equal to or less than the distance V between the axes of the horizontal pins 238 and 244.

The horizontal pins 238 and 244 provided on the link 236 are approximately at the same level when the roof opening 20 is closed by the sliding panel 101. Accordingly, when the rear shoe 228 moves forward from the position shown in FIG. 2 with respect to the front shoe 222, the horizontal pins 238 and 244 move toward the front ends 242A and 248A, respectively. That is, the horizontal pin 238 becomes gradually higher than the horizontal pin 244. This causes the link 236 to be rotated clockwise as viewed in FIG. 2, as it advances toward the front end of the vehicle, raising the rear end of the sliding panel, as shown in FIG. 7.

On the other hand, when the rear shoe 228 retreats, the horizontal pin 238 is guided to a position lower than that of the horizontal pin 244, so that the link 236 is gradually rotated counterclockwise, as seen in FIG. 2, lowering the rear end of the slide panel 101, as shown in FIG. 8.

Figure 6:
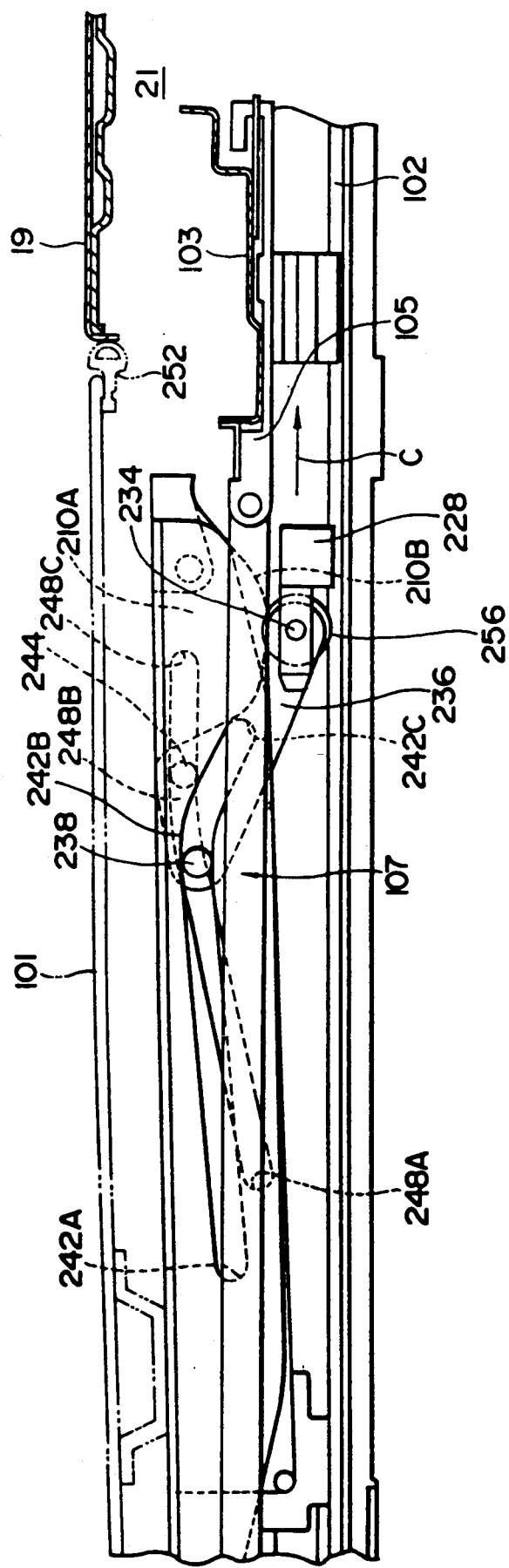
FIG. 6 is an enlarged view of a portion of FIG. 2, showing the sliding panel when it is closed.

Mounted on the horizontal pin 234, by means of which the link 236 is rotatably supported on the rear shoe 228, is a disc-like ring 256 which is made of an elastic material such as rubber and which has a diameter larger than that of the boss section 236A of the link 236. In the state in which the opening 20 is closed and occupied by the sliding panel 101 as shown in FIG. 2, the outer periphery of the disc-like ring 256 is elastically pressed against a lower rear end surface 210B of the vertical section 210A, thereby preventing any rattling of the sliding panel 101. As shown in FIGS. 6 and 7, the lower rear end surface 210B exhibits an arc-like configuration as it extends toward the rear end of the vertical section 210A. When the slide panel 101 moves from the position shown in FIG. 2 to the tilt-down position shown in FIG. 8, the tilt-down movement is not hindered since when a holder 105 retreats, it makes a relative movement with respect to the arc-like lower rear end surface 210B.

Figure 4:
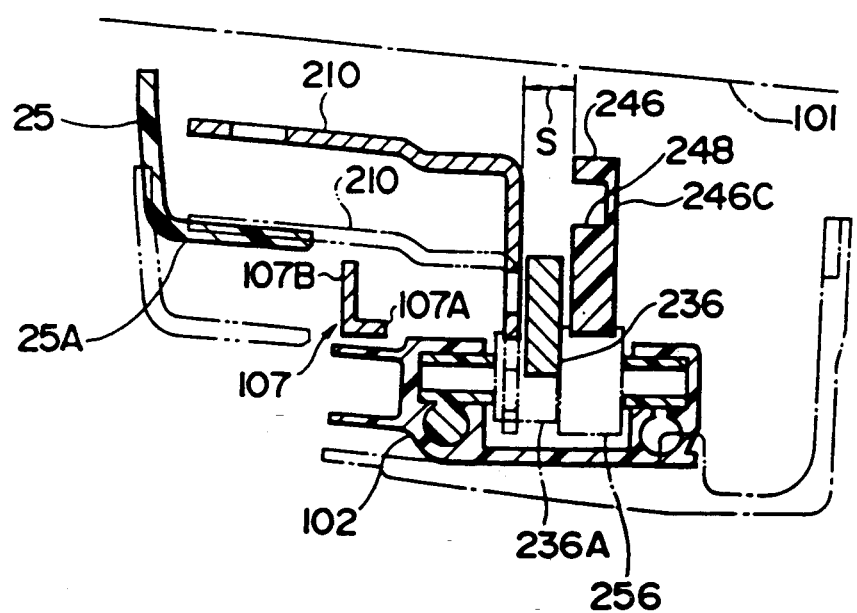
FIG. 4 is a sectional view taken along the line IV—IV of FIGS. 2 and 3, i.e., taken along the longitudinal axis of the vehicle, showing the sliding panel moving mechanism from the right-hand side of the vehicle.

As shown in FIG. 4, the guide groove 248 formed in the guide block 246 does not extend through the guide block 246, but forms a bottomed groove with a thin-walled section 246C left on the outer side. Due to this arrangement, even when the guide block is projected above the vehicle roof through the opening 20 as the slide panel 101 is raised as shown in FIG. 7, no surface irregularities can be observed on the outer side of the guide block due to the presence of the guide groove 248. This helps to avoid generation of wind howling during high-speed travel of the vehicle.

Figure 5:
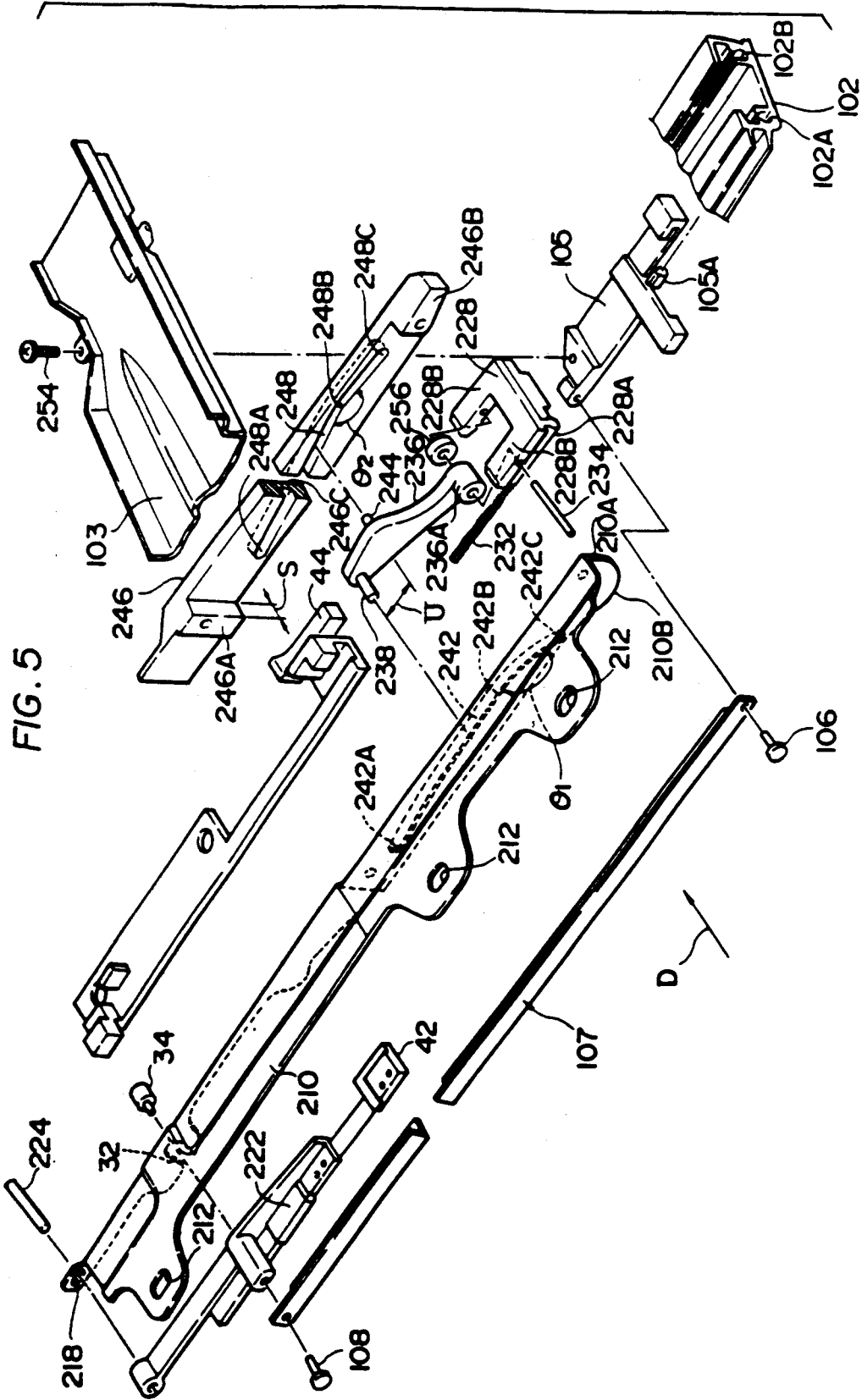
FIG. 5 is an exploded perspective view of FIG. 2.

As shown in FIG. 6, a rain channel 103 is arranged below the section where the weather strip 252 attached to the rear end of the slide panel 101 is in contact with the rear edge of the opening 20 when the opening 20 is closed and occupied by the sliding panel 101, in order to receive any water entering the interior of the vehicle through this section. As shown in FIG. 5, this rain channel 103 is fixed to the holder 105 by means of screws 254. The holder 105 has a downwardly protruding arm 105A, which is guided along a groove 102B of the guide rail 102, thus allowing the holder 105 to slide in the longitudinal direction of the vehicle.

This holder 105 is connected to the rear end of a guide rod 107 by a pin 106. The front end of this guide rod 107 is fixed to the front shoe 222 by a pin 108. Accordingly, the rain channel 103 can move in the longitudinal direction of the vehicle along with the front shoe 222.

A detailed description will now be given of the guide rod 107. As shown in FIG. 4, it has an L-shaped configuration having a horizontal section 107A and a vertical section 107B. Its height is such that it covers the vertical gap between a garnish 25 and the guide rail 102. The upper end section of the garnish 25 is fixed to the slide panel 101 at a position closer to the vehicle interior than the support bracket 210. The lower end section of the garnish 25 is formed as a horizontal section 25A horizontally directed to the vertical section 210A.

However, this guide rod 107 does not overlap the garnish 25 or the vertical section 210A horizontally, so it does not interfere with them even in the tilt-down position (corresponding to FIG. 7) when they are lowered with the slide panel 101.

This arrangement allows the vertical section 107B of the guide rod 107 to prevent the interior of the vehicle from being seen from outside through the gap between the vertical section 210A and the guide rail 102 even when the sliding panel 101 is in the tilt-up position (FIG. 6) in which it is raised. As long as its vertical section 107B is able to provide this advantage, the guide rod 107 need not necessarily have an L-shaped configuration.

Figure 9:
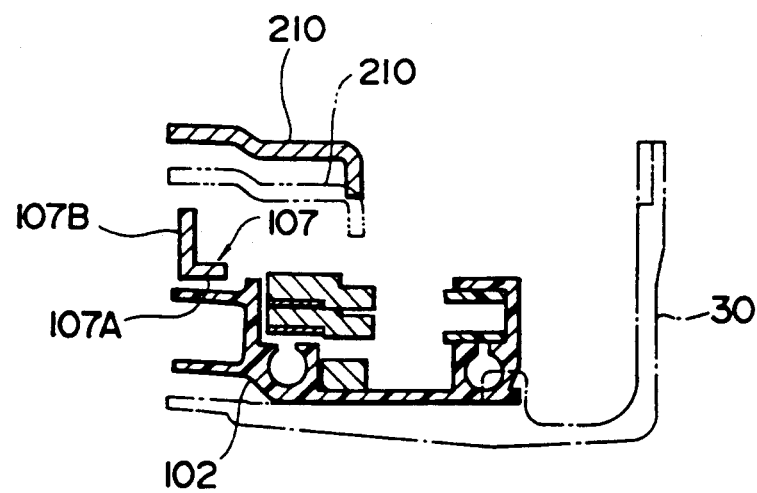
FIGS. 9 to 10 are sectional views taken along the lines IX—IX and X—X, respectively, of FIG. 2.
Figure 10:
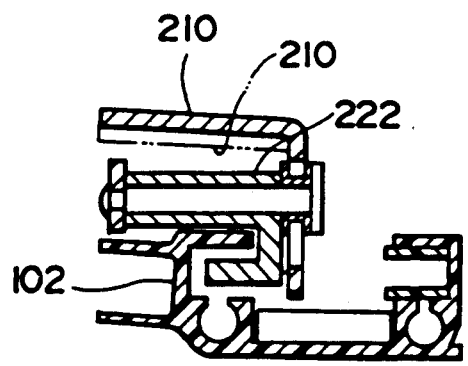

The reference numeral 42 indicates a stopper for retaining the front shoe in position when the sliding panel 101 is moved from the position in which the opening is closed (FIG. 2) to the tilt-up position (FIG. 7) or the tilt-down position (FIG. 8). The reference numeral 44 indicates a lift guide. The reference numeral 30 in FIG. 9 indicates the vertical section of the housing 21.

The operation of this embodiment will now be described.

FIG. 2 shows the state in which the opening 20 is closed by the slide panel 101, the horizontal pins 238 and 244 being arranged in the guide grooves 242 and 248, respectively. Since in this state the disc-like ring 256 mounted on the rear shoe 228 is elastically pressed against the support bracket 210, rattling of both the support bracket 210 and the slide panel 101 is prevented during travel of the vehicle.

When the drive cable 232 is moved toward the front end of the vehicle by operating the driving means (not shown) and the rear shoe 228 advances from the original position shown in FIG. 2, the horizontal pins 238 and 244 moves along the guide grooves 242 and 248, the horizontal pin 238 being guided to a position higher than the horizontal pin 244, thereby gradually bringing the link 236 to the raised position. Accordingly, the panel support bracket 210 is gradually raised as it rotates around the horizontal pin 224, the weather strip 252 moving to a position over the opening 20, thereby opening the rear section of the opening 20. Thus, the tilt-up position shown in FIG. 7 is attained.

Since the slide panel 101 is supported by the link 236 at the two points of the horizontal pins 238 and 244, any rattling of the panel during tilt-up is suppressed.

Since the elongated groove 32 is inclined in the manner shown in FIG. 11, the support bracket 210 is moved toward the rear end of the vehicle when the sliding panel 101 is raised, so the weather strip 226 is separated from the front edge of the opening 20, thereby avoiding generation of excessive friction. Furthermore, the presence of the vertical section 107B in the gap between the sliding panel 101 or the support bracket 210 and the guide rail 102 helps to prevent the interior of the vehicle from being seen through the opening 20 from either side of the vehicle. In addition, since the guide groove 248 does not extend through the guide block 246 but forms a bottomed groove with the thin-walled section 246C left on the outer side of the guide block 246, as shown in FIG. 4, no wind howling is generated even if the vehicle travels at high speed with the sliding panel in the tilt-up state.

To release the tilt-up state, the driving means (not shown) is operated in the reverse direction to move the drive cable 232 toward the rear end of the vehicle. This movement brings the link 236 and the sliding panel 101 gradually to the horizontal position, thus attaining the normal state shown in FIG. 4. In this state, any change in the position of the engagement between the elongated groove 32 and the pin 34 causes the sliding panel 101 to move forward again by a small distance to press the weather strip 226 against the front edge of the opening 20.

To bring the sliding panel 101 to the tilt-down position, the holder 105 is made to retreat by a predetermined distance. This causes the horizontal pins 238 and 244 to move to the rear ends 242C and 248C, respectively, which rotates the link 236 to the position shown in FIG. 8, the sliding panel 101 being lowered in the direction indicated by the arrow B.

While the sliding panel is thus being lowered, the elongated groove 32 is guided by the pin 34 near the front end of the sliding panel 101, causing the support bracket 210 to move forward by a short distance, which helps to avoid generation of excessive friction between the weather strip 252 and the rear edge of the opening 20. As indicated by the imaginary line in FIG. 3, the vertical section 210A and the horizontal section 25A do not interfere with the vertical section 107B when they are lowered.

When the sliding panel 101 is to be lodged in the housing 21, the rear shoe 228 is moved from the position shown in FIG. 8 toward the front end of the vehicle (the direction indicated by the arrow C). To close the opening 20, the guide rail 102 is moved toward the front end of the vehicle, which brings it to the state shown in FIG. 2 through the state shown in FIG. 8. When it is to be raised from the position shown in FIG. 8 to that shown in FIG. 2, the sliding panel 101 moves toward the rear by a small distance due to the engagement between the elongated groove 32 and the pin 34, to press the weather strip 252 against the rear edge of the opening 20.

Figure 12:
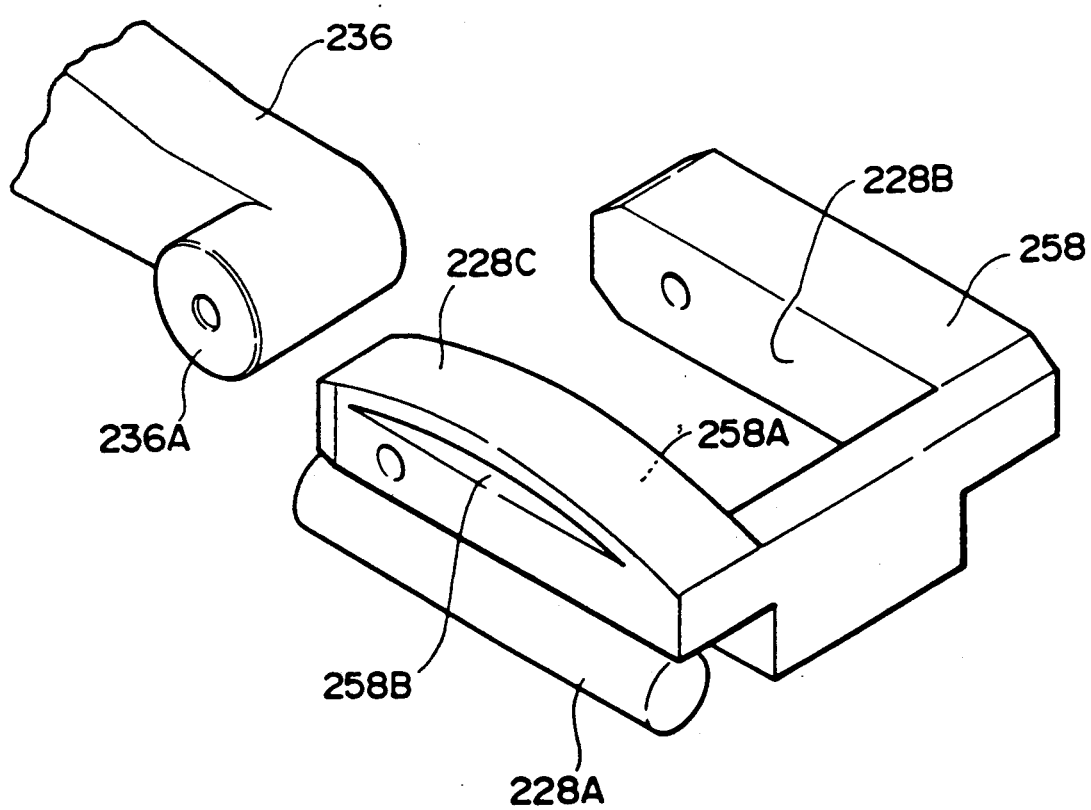
FIG. 12 is a perspective view showing a rear shoe in accordance with another embodiment of this invention.

FIG. 12 shows a rear shoe 258 used in a second embodiment of this invention. In this rear shoe 258, an arch 258A is provided on an arm 228C rotatably supporting a link 236. This arch 258A is made of an elastic material and is fixed at its ends to the upper surface of the arm 228C, the middle section thereof providing a gap 258B. Accordingly, when the upper surface of the middle section of the arch 258A is elastically pressed against the lower rear end surface 210B shown in FIG. 5, rattling of the sliding panel 101 can be prevented when the opening 20 is in the closed state, as in the above-described embodiment. Thus, it is not necessary to separately provide a disc-like ring 256 as in the first-described embodiment.

What is claimed is:

1. A panel moving mechanism for a sunshine roof of the type in which a rear end of a panel for closing an opening provided in the roof of a vehicle can be raised to a tilt-up position and lowered to a tilt-down position, the mechanism comprising:
   (a) means for rotatably supporting a front end section of said panel;
   (b) a guide rail mounted in the vehicle adjacent to the opening in the roof and extending in the longitudinal direction of the vehicle;
   (c) a shoe mounted for movement along the guide rail;
   (d) means for selectively moving the shoe along the guide rail;
   (e) an arm;
   (f) means for pivotally mounting said arm on said shoe; and
   (g) a guide means fixed in relation to said panel, said guide means including means provided with first and second elongated guide grooves, each guide groove having a longitudinal axis and a front end and a rear end, and first and second pins mounted on said arm, each pin being inserted into a respective one of said guide grooves so as to be guided for movement between the front and rear ends of the respective groove, said first and second guide grooves being arranged in such a manner that relative movement of said shoe toward one of the front and rear ends of said guide grooves causes said arm to be gradually brought to a raised position to raise the panel, and relative movement of said shoe toward the other of the front and rear ends of said guide grooves causes said arm to be gradually brought to a horizontal position to lower the panel.

2. A panel moving mechanism for a sunshine roof according to claim 1, wherein each of said guide grooves changes direction at a location that is intermediate between the front and rear ends thereof where the respective one of said pins is situated when the roof opening is closed by said panel.

3. A panel moving mechanism for a sunshine roof according to claim 1, wherein each of said pins is situated in a section of the corresponding one of said guide grooves that is intermediate between the front and rear ends thereof when the roof opening is closed by said panel, each of said guide grooves being downwardly inclined from said intermediate section toward at least one of the front and rear ends of the guide grooves.

4. A panel moving mechanism for a sunshine roof according to claim 3, wherein the distance between said intermediate section and the front end of each of said guide grooves is longer than the distance between said intermediate section and the rear end thereof.

5. A panel moving mechanism for a sunshine roof according to claim 3, wherein the longitudinal axes of said first and second guide grooves are inclined at different angles from the respective intermediate sections towards at least one of the respective front ends and rear ends.

6. A panel moving mechanism for a sunshine roof according to claim 1, wherein said pins are parallel to each other and protrude from said arm in opposite directions.

7. A panel moving mechanism for a sunshine roof according to claim 6, wherein the means provided with first and second guide grooves comprises a panel support bracket and a guide block fixed in relation to the panel support bracket, said first and second guide grooves being respectively formed in said panel support bracket and in said guide block.

8. A panel moving mechanism for a sunshine roof according to claim 7, wherein said guide block is at a position nearer to an outer lateral side of the vehicle than said panel support bracket, and the guide groove formed in said guide block is a bottomed groove closed on the outer side, so as to prevent generation of wind whistle during travel of the vehicle.

9. A panel moving mechanism for a sunshine roof according to claim 1, further comprising a resilient member supported by said means for mounting said arm pivotally on said shoe and an element that is fixed with respect to the panel, the resilient member being formed such as to be elastically pressed against said element fixed with respect to the panel when the roof opening is closed and occupied by said panel, so as to prevent the panel from rattling.

10. A panel moving mechanism for a sunshine roof according to claim 1, wherein the means for rotatably supporting the front end section of said panel comprises a front shoe, hinge means connecting the panel to the front shoe so that the panel is capable of moving relative to said front shoe both pivotally and in the longitudinal direction of the vehicle by a small distance, and a cam mechanism provided between the panel and said front shoe for causing the front end of the panel to move toward the rear when the panel is raised and for causing the rear end of the panel to move forward when the panel is lowered.

11. A panel moving mechanism for a sunshine roof according to claim 10, wherein said cam mechanism comprises a panel support bracket formed with a third elongated groove and a pin fixed to said front shoe and slidably engaged in said third elongated groove.

12. A panel moving mechanism for a sunshine roof according to claim 1, wherein the means for rotatably supporting the front end section of said panel comprises a front shoe and hinge means connecting the panel to the front shoe such that the panel can move relative to said front shoe, and the mechanism further comprises a rain channel, a guide rod having a front end connected to the front shoe and a rear end connected to the rain channel, said rain channel being arranged below a location where the rear end of the panel contacts a rear edge of the roof opening in the closed position of the panel, so as to receive any water entering through this contact location.

13. A panel moving mechanism for a sunshine roof according to claim 12, wherein the means provided with said first and second guide grooves comprises a panel support bracket having a vertical section provided with one of said first and second guide grooves, and said guide rod is arranged, when the panel is in the tilt-down state, between the vertical section of said panel support bracket and a garnish located laterally toward the vehicle interior relative to the panel support bracket.

14. A panel moving mechanism for a sunshine roof according to claim 1, further comprising a resilient member provided on said shoe and an element that is fixed with respect to the panel, said resilient member being formed so as to be pressed against said element fixed with respect to the panel near the rear end thereof when the panel closes the opening so as to prevent rattling.

15. A panel moving mechanism for a sunshine roof of the type which has a panel for opening and closing an opening provided in the roof of a vehicle, the mechanism comprising:
   (a) a panel support bracket fixed in relation to said panel, said panel support bracket having a front end and a rear end and including a first elongated guide groove having a front end and a rear end and extending in the longitudinal direction of the vehicle and bent at a section intermediate between the front and rear ends;
   (b) a front shoe which rotatably supports said bracket at a position near the front end thereof;
   (c) means for mounting the front shoe in the vehicle adjacent to the roof opening for movement in the longitudinal direction of the vehicle;
   (d) a rear shoe;
   (e) means for mounting the rear shoe in the vehicle adjacent to the roof opening for movement in the longitudinal direction of the vehicle independently of said front shoe;
   (f) an arm rotatably supported by said rear shoe;
   (g) a first pin which protrudes from said arm and which is inserted into said first guide groove formed in said panel support bracket;
   (h) a guide block fixed in relation to said panel and extending parallel to said bracket, said guide block having a second elongated guide groove having a front end and a rear end and which is bent at a section intermediate between the front and rear ends thereof; and
   (i) a second pin which protrudes from said arm and which is inserted into said second guide groove.

16. A panel moving mechanism for a sunshine roof according to claim 15, wherein said first and second pins protrude from said arm in opposite directions.

17. A panel moving mechanism for a sunshine roof according to claim 16, wherein said first guide groove is formed in a vertical section of said bracket, and said guide block is fixed to the outer side of this vertical section.

18. A panel moving mechanism for a sunshine roof according to claim 17, wherein said first and second grooves are so arranged that each intermediate section is higher than the front and rear ends of the respective groove when the roof opening is closed and occupied by the panel.

19. A panel moving mechanism for a sunshine roof of the type in which the rear end of a panel for opening and closing an opening of the roof of a vehicle is raised to a tilt-up position that is higher than the roof and is lowered to a tilt-down position that is lower than the roof, the mechanism comprising:
   (a) a panel support bracket fixed in relation to said panel, said panel support bracket having a front end, a rear end, and a vertical section in which a first guide groove is formed which extends in the longitudinal direction of the vehicle and which is bent at a middle section thereof;
   (b) a front shoe mounted inside the roof for movement in the longitudinal direction of the vehicle and which rotatably supports said bracket at a position near the front end thereof;
   (c) a rear shoe mounted inside the roof for movement in the longitudinal direction of the vehicle independently of said front shoe;
   (d) an arm which is rotatably supported by said rear shoe;
   (e) a first guide pin which protrudes from said arm and which is inserted into said first guide groove formed in said panel support bracket;
   (f) a guide block which is fixed in relation to an outer side of the vertical section of said panel support bracket and which includes a second guide groove facing said first guide groove, said second guide groove being bent at a middle section thereof; and
   (g) a second guide pin which protrudes from said arm in a direction opposite to the direction of protrusion of said first guide pin and which is inserted into said second guide groove.

20. A panel moving mechanism for a sunshine roof according to claim 19, further comprising an elastic member provided on said rear shoe, said elastic member being pressed against said panel support bracket when the roof opening is closed and occupied by said panel.

* * * * *